Feb. 21, 1956  O. F. KALBERER  2,735,182

PROTRACTOR

Filed Feb. 5, 1953

INVENTOR.
Otto F. Kalberer
BY
Barlow & Barlow
ATTORNEYS.

United States Patent Office 2,735,182
Patented Feb. 21, 1956

2,735,182
PROTRACTOR

Otto F. Kalberer, Warwick, R. I., assignor to Industrial Tool & Machine Co., a corporation of Rhode Island Application February 5, 1953, Serial No. 335,250

2 Claims. (Cl. 33—75)

This invention relates to a protractor for obtaining an angular position of work on a machine tool table.

In machine tool work consisting of miscellaneous items, as for example milling miscellaneous parts on a milling machine, the conventional use of the usual protractor and like instruments for obtaining an angular setting of each individual piece of work is relatively costly and often involves considerable labor.

The object of the invention is to provide a protractor which in conjunction with the slots of the machine tool table will obtain angles for setting up the work on the table.

With this and other objects in view, the invention consists of certain novel features of construction as will be more fully described and particularly pointed out in the appended claims.

In a preferred embodiment of the invention I provide a protractor frame of a semi-circular form, the straight side of which provides a straight edge for the work to be placed against or to provide a reference line in setting up the work. On the straight side of the frame at a mid point thereon I attach a key or like element, which may take any of various forms which may be circular in cross section or otherwise as the choice may be and which is adapted to engage in the slot of a table of a machine tool. The key is attached at a fixed position relative to a second key which is adjustably positioned along the curved portion of the frame so as to provide for various angular spacing between the keys with respect to a reference or datum point on the frame. The adjustable positions of the second key along the curved portion of the frame may be spaced at various distances from the first key whereby any one of a number of angular settings may be provided. Preferably the said adjustable positions may be equally spaced from the said first key, since sufficient positions or angular spacing may be provided for practical use. The two similar keys are adapted to be received in the same T slot of the machine tool table to mount the frame on the table, which by selection of the proper opening in the frame will position the straight edge to make the desired angle with respect to a reference point. Thus, the position of the second key may be chosen so that when the protractor is placed upon the machine tool table, it is held in place at the proper angular setting desired.

Figure 5:
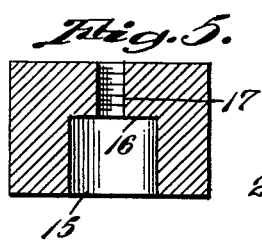
Figure 5 is a sectional view taken substantially along line 5—5 of Figure 2.

Referring to the drawings for a more detailed description, 10 designates generally a protractor having a frame 11 of a conventional semi-circular form which may have an open center as shown providing a central arm 12 integrally joining the straight bar 13 to the curved side 14. On this frame 11 I provide a plurality of similar openings or circular recesses 15 (see Figure 5) which extend inwardly from the bottom side of the frame. Each recess 15 has a bottom wall 16 and a threaded opening 17 extending from the upper side of the frame to open into the said recess 15. One of these recesses 15, which will hereinafter be referred to as a first recess, is positioned on the straight bar 13 at a mid-point thereon and indicated 15'. The other recesses are positioned on the curved side of the frame, and hereinafter will be referred to as second recesses and are designated generally 18. The recess 19 of this group of recesses 18 provides a reference or datum point, and the edge 20 of the bar 13 extends parallel to a plane passing centrally through the first said recess 15' and the recess 19.

Figure 1:
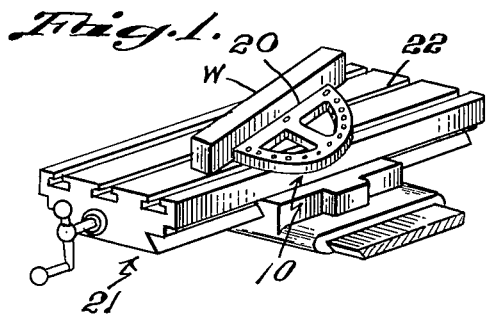
Figure 1 is a perspective view of a milling machine tool table illustrating a protractor embodying my invention in place thereon and against which a piece of work is shown.
Figure 2:
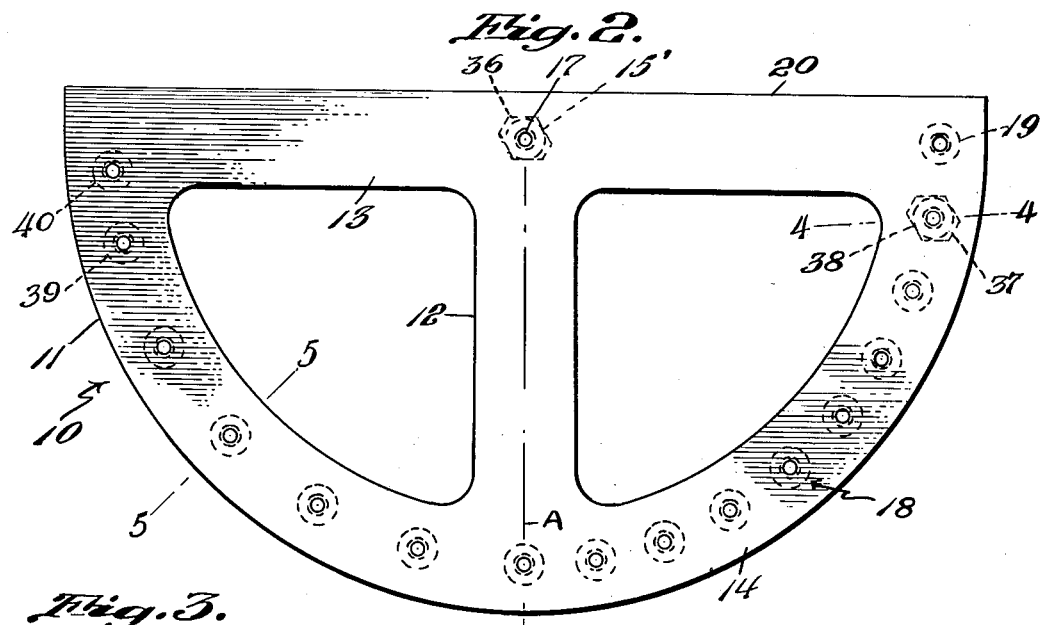
Figure 2 is a plan view of the protractor shown in Figure 1.
Figure 3:
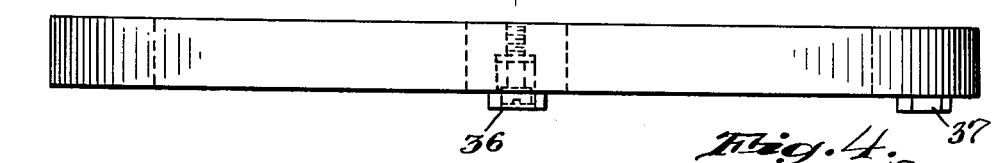
Figure 3 is an edge view thereof.

In the present embodiment of the invention, the protractor is employed to obtain an angle on a milling machine table 21 which is conventionally illustrated in Figure 1. Such tables are usually provided with longitudinal inverted T slots 22 for receiving the head of usual bolts employed for securing clamps, fixtures, and the like to the table.

Figure 6:
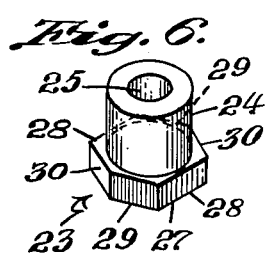
Figure 6 is a perspective view of a key element forming part of the protractor.
Figure 4:
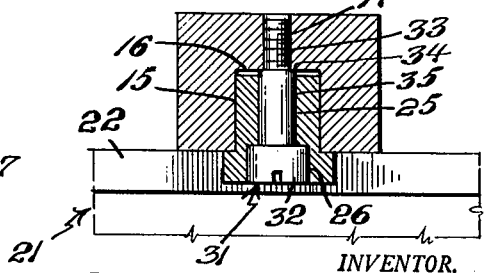
Figure 4 is a sectional view taken substantially along line 4—4 of Figure 2 and including a portion of the table shown in Figure 1.

A key designated generally 23 (see Figure 6) which is adapted to be received in the upper portion of a slot 22 has a cylindrical body 24 provided with a bore 25 which extends inwardly from the upper end of the body and is enlarged as at 26 at the lower end thereof (see Figure 4). The lower end of the body terminates in a flange 27 having a non-uniform hexagonal shape, in which a pair of opposite parallel sides are adapted to engage in one size slot and other pairs of sides are adapted to engage different size slots which may be provided on different machine tool tables. Thus, the spacing between the sides 28 of the flange is different from the spacing between the other two pair of parallel sides, in effect providing three different size keys. The body of the key 23 is rotatably received in the recess 15 with the flange 27 engaging against the lower side of the body (best shown in Figure 4). A stud bolt 31 having a head 32 and a reduced threaded end portion 33 forming a shoulder 34 with the shank 35 is received in the bore 25 of the key and threadedly engages the opening 17 with the shoulder 34 abutting against the wall 16 and the head 32 nesting in the enlarged portion 26. One of said keys is received in the recess 15' and is designated a first key 36. A similar second key designated 37 is similarly received and secured in any one of a chosen recess 18, as for example the recess 38. With both keys now secured in the proper position and properly oriented, the protractor may now be placed upon the table 21 for the keys to lodge in a slot 22, and the edge 20 provides a straight edge extending at a chosen direction to the sides of the slot or travel of the cutter of the machine to provide a desired angle included between the straight edge and side of the slot and against which the work W may be placed to locate the same upon the said machine table, this angle being that corresponding to the angular spacing between the first of said recesses and the recess 38 with reference to the datum point 19.

The recesses 18 may be spaced from each other in any desired order depending upon the particular work to be used with the protractor. However, the order of the spacing shown has been found satisfactory. The recesses on the right of the line A are spaced 10 degrees apart, while the recesses on the left of the line A are spaced 15 degrees apart with the exception of the recesses 39 and 40 which are spaced 10 degrees apart.

It may now be apparent that I have disclosed a tool of very simple construction, easily adjusted, to obtain various angles on a machine tool table, and which is particularly adapted for use on milling machines wherein the work consists of miscellaneous parts of which there is not a sufficient quantity of each to warrant the expense of a special jig or fixtures.

I claim:

1. In combination with a machine tool table having a longitudinal slot therein, a protractor for obtaining angles on said table with reference to said slot comprising a semi-circular frame providing a straight bar and a curved side, a first recess on the straight bar of said frame at the mid point thereof, a plurality of similar second recesses on the curved side of said frame spaced from each other, one of said second recesses providing a datum point, a first key pivotally received in said first recess, a second key pivotally received in a selected one of the second recesses, said frame having a straight edge thereon extending parallel to a plane passing centrally through said first recess and the said datum second recess, said keys being adapted to be received in engagement with the sides of said slot to mount said frame on said table to position said straight edge to make an included angle with the side of said slot corresponding to the angular spacing between said keys with reference to the said datum point.

2. In combination as set forth in claim 1 wherein a number of said plurality of second recesses are spaced 10 degrees apart and a lesser number are spaced 15 degrees apart.

References Cited in the file of this patent

UNITED STATES PATENTS

| | | |
|---|---|---|
| 271,408 | Brennan | Jan. 30, 1883 |
| 851,947 | Lalane | Apr. 30, 1907 |
| 905,249 | Townsend | Dec. 1, 1908 |
| 1,048,319 | Knights | Dec. 24, 1912 |
| 1,118,067 | Smith | Nov. 24, 1914 |
| 1,864,341 | Davie | June 21, 1932 |
| 2,502,124 | Bray | Mar. 28, 1950 |
| 2,594,574 | Marsden | Apr. 29, 1952 |